United States Patent
Atarius et al.

(10) Patent No.: US 6,526,035 B1
(45) Date of Patent: Feb. 25, 2003

(54) METHOD AND APPARATUS FOR IDENTIFYING THE SOURCE OF A DIGITAL SIGNAL

(75) Inventors: Roozbeh Atarius, Lund (SE); Christer Östberg, Staffansttorp (SE); Håkan B. Eriksson, Lund (SE); Håkan Henningsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/093,315

(22) Filed: Jun. 9, 1998

(51) Int. Cl.$^7$ .............................................. H04B 7/216
(52) U.S. Cl. ..................... 370/342; 370/509; 370/335
(58) Field of Search ................................ 370/310, 313, 370/328, 331, 334, 342, 345, 350, 563, 569, 441

(56) References Cited

U.S. PATENT DOCUMENTS

| | | | |
|---|---|---|---|
| 5,309,474 A | 5/1994 | Gilhousen et al. | |
| 5,313,457 A | 5/1994 | Hostetter et al. | |
| 5,568,472 A | 10/1996 | Umeda et al. | |
| 5,594,718 A | 1/1997 | Weaver, Jr. et al. | |
| 5,640,414 A | 6/1997 | Blakeney, II et al. | |
| 5,652,748 A | 7/1997 | Jolma et al. | |
| 5,703,873 A | 12/1997 | Ojanpera et al. | |
| 5,758,288 A | 5/1998 | Dunn et al. | |
| 5,914,943 A * | 6/1999 | Higuchi et al. | 370/320 |
| 5,945,948 A * | 8/1999 | Buford et al. | 342/457 |
| 5,991,330 A * | 11/1999 | Dahlman et al. | 375/200 |
| 6,185,244 B1 * | 2/2000 | Nystrom et al. | 375/145 |

FOREIGN PATENT DOCUMENTS

| | | |
|---|---|---|
| WO | WO 95/34174 | 12/1995 |

* cited by examiner

*Primary Examiner*—Hassan Kizou
*Assistant Examiner*—Ahmed Elallam
(74) *Attorney, Agent, or Firm*—Burns, Doane, Swecker & Mathis, L.L.P.

(57) ABSTRACT

A receiver can identify the source of a signal from an unsynchronized source. The receiver has an antenna for receiving two signals. The receiver correlates the first signal with a code to find a first location in time, and correlates the second signal with the same code to find a second location in time. The receiver calculates a time difference between the first location in time and the second location in time and uses the time difference to identify the source of the two signals. A group of base stations or directional antennas use the same long code and synchronization codes. However, each source shifts the long code by a different amount so that for any two sources there is a unique difference between the shifts in the long code. Each source shifts a set of synchronization codes the same amount as the long code. The synchronization codes can be any short code that is relatively easy for the mobile station to detect. When the receiver receives the two signals, the receiver calculates the difference in the shifts. Because there is a unique difference for each pair of sources, the receiver can identify the source of a signal from an unsynchronized source without having to connect to the source to use a broadcast channel or control channel. The receiver can distinguish between different synchronized sources without any prior synchronization.

34 Claims, 7 Drawing Sheets

FIG. 1

RELATED ART

FIG. 2a

RELATED ART

FIG. 2b

RELATED ART

METHOD AND APPARATUS FOR IDENTIFYING THE SOURCE OF A DIGITAL SIGNAL

BACKGROUND

The invention relates to cellular radio telephone communication systems, and more particularly, to identifying the source of a digital signal in a cellular system.

The cellular telephone industry is growing exponentially in the United States as well as the rest of the world. Growth in major metropolitan areas has far exceeded expectations and is outgrowing system capacity. If this trend continues, the effects of rapid growth will reach even the smallest markets. Innovative solutions are required to meet these increasing capacity needs as well as to maintain high quality service and avoid rising prices.

Throughout the world, one important change in cellular systems is the transition from analog to digital systems. Equally important is the choice of an effective digital transmission scheme. Channel access is often achieved using frequency division multiple access (FDMA) and time division multiple access (TDMA) methods. In FDMA, a communication channel is a single radio frequency band into which a signal's transmission power is concentrated. Interference with adjacent channels is limited by the use of bandpass filters which only pass signal energy within the specified frequency band. Thus, with each channel being assigned a different frequency, system capacity is limited by the available frequencies as well as by limitations imposed by radio channels.

In TDMA systems, a channel consists of a time slot in a periodic train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, the portion of the interference from different relative signal strength levels is reduced. However, to support more users, the information has to be transmitted in shorter time slots at a faster bit rate.

With FDMA or TDMA systems, or a hybrid FDMA/TDMA system, it is desirable to avoid the case where two potentially interfering signals occupy the same frequency at the same time. In contrast, code division multiple access (CDMA) allows signals to overlap in both time and frequency. Thus, all CDMA signals share the same frequency spectrum. In either the frequency or the time domain, the multiple access signals appear to be on top of each other.

In principle, the information data stream to be transmitted is first coded or spread using a unique spreading code and then combined with a long PN-sequence or a shorter scrambling-sequence. In the latter case, the scrambling-sequences are planned from cell to cell so that neighboring cells use different scrambling-sequences or scrambling-masks. The information data stream and the PN-sequence or the scrambling sequence can have the same or different bit rates. The information data stream and the PN-sequence or the scrambling-sequence are combined by multiplying the two bit streams together. The bits of the unique spreading code and long PN-sequence are usually referred to as chips.

A plurality of coded information signals are transmitted on radio frequency carrier waves and jointly received as a composite signal at a receiver. Each of the coded signals overlaps all of the other coded signals, as well as noise related signals, in both frequency and time. By correlating the composite signal with one of the unique spreading codes, a corresponding information signal is isolated and decoded.

Figure 1:
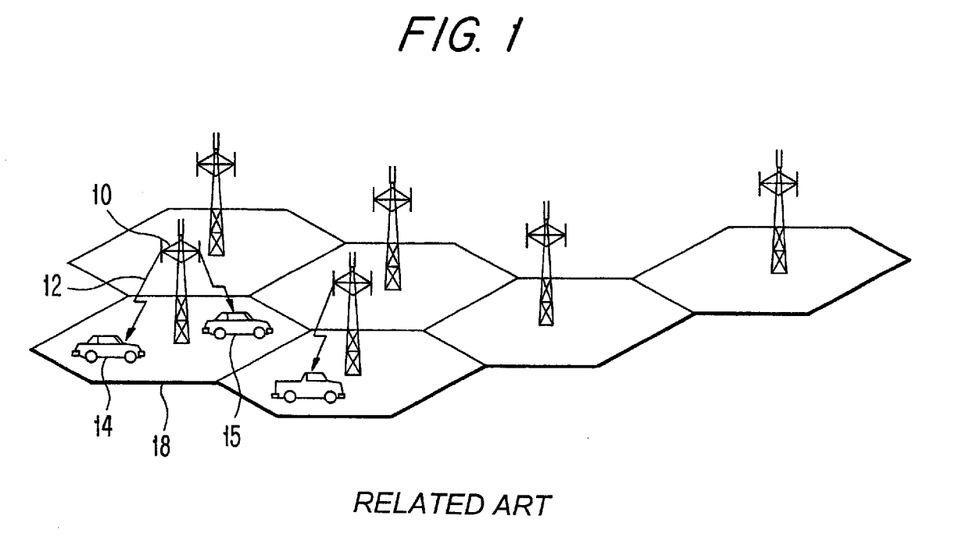
FIG. 1 illustrates the use of base stations to transmit radio waves to mobile users in a cellular system.

FIG. 1 illustrates the use of base stations to transmit radio waves to mobile users (mobile stations) in a cellular system. Base station 10 transmits a signal 12 that has a maximum signal strength that is limited so as to reduce interference with other base stations. The maximum signal strength of the base station's transmission creates a foot print or a region within which mobile stations can easily communicate with base station 10. If base station 10 uses a single omni-directional antenna, the foot print extends in an unlimited direction, i.e. 360 degrees. While each footprint is an irregular shape that overlaps with adjacent foot prints, a foot print is often depicted as a hexagon 18 and is usually referred to as a cell.

In a CDMA system, base station 10 can transmit signals to mobile stations 14 and 15 as a single (composite) signal. The signal directed to mobile station 14 is typically coded with a short code that is orthogonal to a short code that is used to code the signal directed to mobile station 15. These signals are spread with a code that is sometimes referred to as a long code. The sum of the two coded and spread signals is then transmitted by base station 10. When mobile station 14 receives the composite signal, mobile station 14 multiplies the spread signal with the long code and the short code to recreate the signal directed to mobile station 14 and the signal directed to mobile station 15 is suppressed as interference noise. Similarly, mobile station 15 multiplies the spread signal with the long code and the short code assigned to mobile station 15 to recreate the signal directed to mobile station 15 and the signal directed to mobile station 14 is suppressed as interference noise. The interference noise is usually not distracting to the user of the mobile station, but as the number of mobile stations increases, so does the level of interference noise. If the omni-directional antenna at base station 10 is replaced with directional antennas, it is possible to divide cell 18 into smaller sectors and thereby reduce system interference. The use of directional antennas increases the capacity of a cellular system and is usually referred to as sectoring.

Figure 2A:
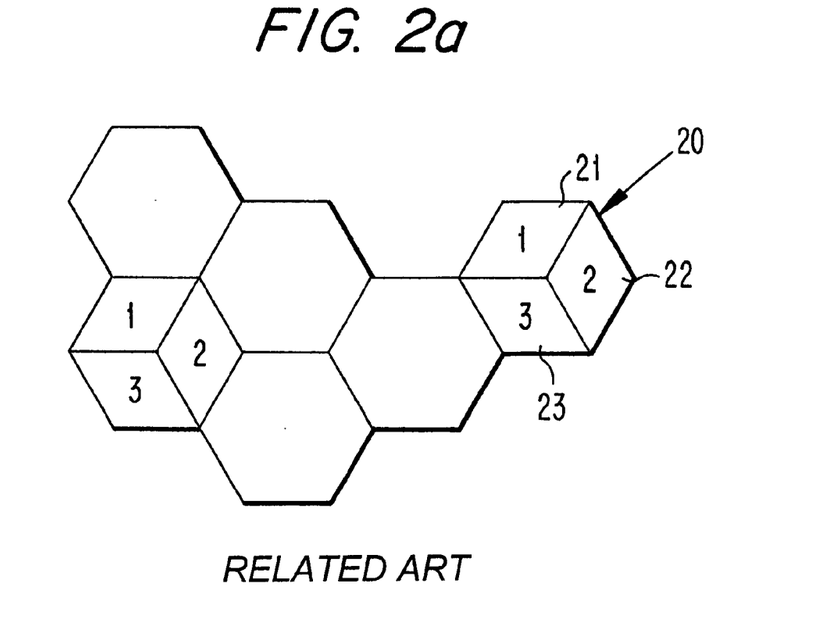
FIGS. 2a and 2b illustrate the use of directional antennas to divide a cell into smaller sectors.
Figure 2B:
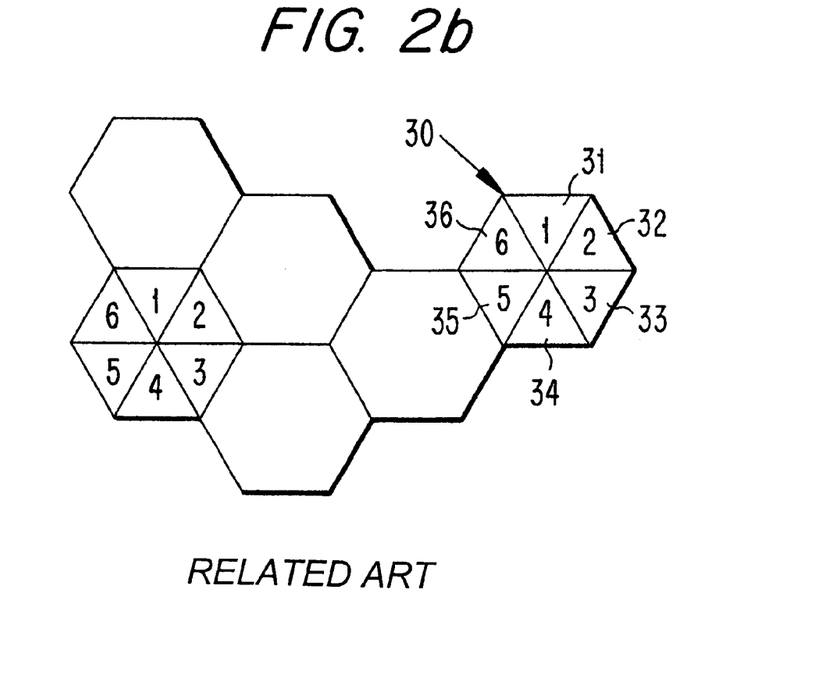

FIG. 2a illustrates the use of three directional antennas to divide a cell into three 120° sectors. Cell 20 has three sectors 21, 22, and 23. FIG. 2b illustrates the use of six directional antennas to divide a cell into six 60° sectors. Cell 30 has six sectors 31, 32, ..., and 36. If base station 10 uses directional antennas, base station 10 can transmit more than one composite signal. When a base station uses directional antennas, each directional antenna transmits to a smaller number of mobile stations than a single antenna would. As a result, the amount of interference decreases and the base station can support a larger number of mobile stations without exceeding an acceptable level of interference noise.

It is sometimes advantageous to transmit the same signal to the same mobile station via more than one source, that is, to provide diversity reception. Sometimes the best source is the source that provides the best signal to noise ratio. Other times the best source is the source that minimizes the interference experienced by the other mobile stations in the system.

As a mobile station moves away from a source (antenna), the quality of the received signal usually decreases. When the quality of the received signal decreases to the point that another source can provide a better signal or the system determines that it can decrease the amount of interference experienced by other mobile stations in the system, the system should perform a handoff. The base station or base stations can perform what is referred to as a soft handoff. A soft handoff occurs when the original source and the new source transmit substantially the same information to the mobile station at the same time and, subsequently, the original source terminates its transmission. If the mobile station is using a RAKE receiver, the signal from the new source appears as additional multipaths, and the RAKE receiver can process the two signals as a single signal.

In some cases, the original base station continues to serve the mobile station, but handsoff the mobile station to a better directional antenna. In other cases, the original base station hands off the mobile station to a neighboring base station. If the neighboring base station has directional antennas, the base station should not only handoff the mobile station to the new base station, but to the directional antenna that provides the best signal.

The mobile station can assist the system in performing the handoff by (1) measuring the quality of signals received from other sources, and (2) reporting these measurements back to the system. If the mobile station receives a better signal from another source, it is helpful if the mobile station can determine the cell number, and if appropriate, the sector number of the better source. This technique is commonly referred to as mobile assisted handoff (MAHO).

When a mobile station is synchronized with a source that is one of a group of sources that are synchronized (or that use a common time reference), it is relatively easy for the mobile station to determine the source of a signal from one of the other sources in the group. For example, assume that a group of base stations are synchronized (or use a common time reference) and that the base stations use the same long code. If the mobile station is synchronized with one base station in the group, the mobile station is synchronized with all the base stations in the group. If each base station shifts the long code a different pre-determined amount, the mobile station can identify the source of signals from other base stations in the group by measuring the amount that the long code has been shifted.

Assume that a second group of base stations is synchronized with or uses the same time reference as the first group. If the mobile station is synchronized with one base station in the first group, the mobile station is synchronized with all the base stations in the second group. The second group of base stations can use a second long code. The mobile station can store or obtain a list of long codes used by the other groups in the cellular system. If each of the base stations in the second group shifts the second long code a different predetermined amount, the mobile station can identify the source (that is, the cell number) of signals from base stations in the second group by calculating how much the second long code has been shifted. If, however, the first group is not synchronized with the second group, the mobile station can not directly identify how much the long code has been shifted.

Assume now that a base station uses directional antennas and that each directional antenna at the base station is synchronized or uses the same time reference. It will be evident to those skilled in the art that directional antennas can use different long codes, and that directional antennas from different base stations can be grouped together. However, assume that each directional antenna uses the same long code. If the mobile station is synchronized with one of the directional antennas, the mobile station is synchronized with all the directional antennas. If each directional antenna shifts the long code a different pre-determined amount, the mobile station can identify the source (i.e., the cell number and the sector number) of signals from directional antennas at the base station by calculating how much the long code has been shifted.

Assume now that a second base station uses directional antennas and that each directional antenna at the second base station is synchronized or uses the same time reference as the directional antennas at the first base station. If the mobile station is synchronized with any one of the directional antennas at the first base station, the mobile station is synchronized with all the directional antennas at the second base station. The second base station can use a second long code. If each directional antenna at the second base station shifts the second long code a different pre-determined amount, the mobile station can identify the source (i.e., the cell number and the sector number) of signals from directional antennas at the second base station by measuring the amount that the second long code has been shifted. If, however, the directional antennas at the second base station are not synchronized with the directional antennas at the first base station, the mobile station can not directly identify how much the long code has been shifted.

In most cases, the only way that the mobile station can identify the source of unsynchronized signals is to connect to the source of the unsynchronized signal and receive information via a broadcast channel or control channel. To connect to and receive information from the broadcast or control channel is timely and costly. Connecting to and receiving information from the broadcast channel or control channel usually involves additional hardware and software and decreases the battery life of the mobile station. Thus, there is a need for a method for a mobile station to directly identify the source (i.e., the cell number or the cell number and the sector number) of a signal from an unsynchronized source.

SUMMARY

These and other drawbacks, problems, and limitations of conventional cellular systems are overcome by a method and apparatus for identifying the source of a signal from an unsynchronized source. According to one aspect of the invention, a receiver has an antenna for receiving two signals. The receiver correlates the first signal with a code to find a first location in time, and correlates the second signal with the same code to find a second location in time. The receiver calculates a time difference between the first location in time and the second location in time and uses the time difference to identify the source of the two signals.

According to another aspect of the invention, a cellular system has multiple sources and each source multiplies a signal by a long code before transmitting the signal. Each source shifts the long code by a different amount so that for any two sources there is a unique difference between the shifts in the long code. For example, a first source shifts the long code an amount equal to one; a second source shifts the long code an amount equal to two; and, a third source shifts the long code an amount equal to four. The numbers one, two, and four can correspond to a number of chips or a number of symbols.

Using this example, the difference between the long code shift at the first source and the second source is equal to one, the difference between the long code shift at the second source and the third source is equal to two, and the difference between the long code shift at the first source and the third source is equal to three. If a receiver receives two signals and the difference between the two long code shifts is one, the receiver knows that the two signals are from the first source and the second source; if the difference is two, the two signals are from the second source and third source; and, if the difference is three, the two signals are from the first source and the third source.

According to another aspect of the invention, each signal has a synchronization code that is shifted an amount equal to the shift in the long code. The synchronization code is usually, but not always, repeated in time. For example, if a frame has multiple slots, the synchronization code can be repeated in each slot or every other slot. The synchronization code can be any type of pilot or pilot code that is relatively easy for the mobile station to detect.

Using the example above, the first source shifts the synchronization code an amount equal to one; the second source shifts the synchronization code an amount equal to two; and, the third source shifts the synchronization code an amount equal to four. Because each synchronization code is shifted an amount equal to the shift in the long code, each synchronization code is multiplied by the same portions of the long code. As a result, it is relatively easy for the receiver to determine the relative slot (or frame) position of each synchronization code. For any two sources, there is a unique difference between the relative positions of the synchronization codes. Therefore, if a receiver receives two signals and the difference between the relative positions is one, the receiver knows that the two signals are from the first source and the second source; if the difference is two, the two signals are from the second source and the third source; and, if the difference is three, the two signals are from the first source and the third source.

An advantage of the invention is that it is possible to identify the source of a signal without having to connect to the source to use a broadcast channel or control channel. Another advantage of the invention is that a receiver can distinguish between different synchronized sources without any prior synchronization.

BRIEF DESCRIPTION OF THE DRAWINGS

The foregoing, and other objects, features, and advantages of the invention will be more readily understood upon reading the following detailed description in conjunction with the drawings in which.

DETAILED DESCRIPTION

In the following description, specific details are set forth in order to provide a thorough understanding of the invention. However, it will be apparent to those skilled in the art that the invention can be practiced in other embodiments that depart from these specific details. In other instances, detailed descriptions of well-known methods and circuits are omitted so as not to obscure the description of the invention with unnecessary detail.

As discussed above, FIG. 1 illustrates the use of base stations to transmit radio waves to mobile users in a cellular system and FIGS. 2a and 2b illustrate the use of directional antennas to divide a cell into smaller sectors.

Figure 3:
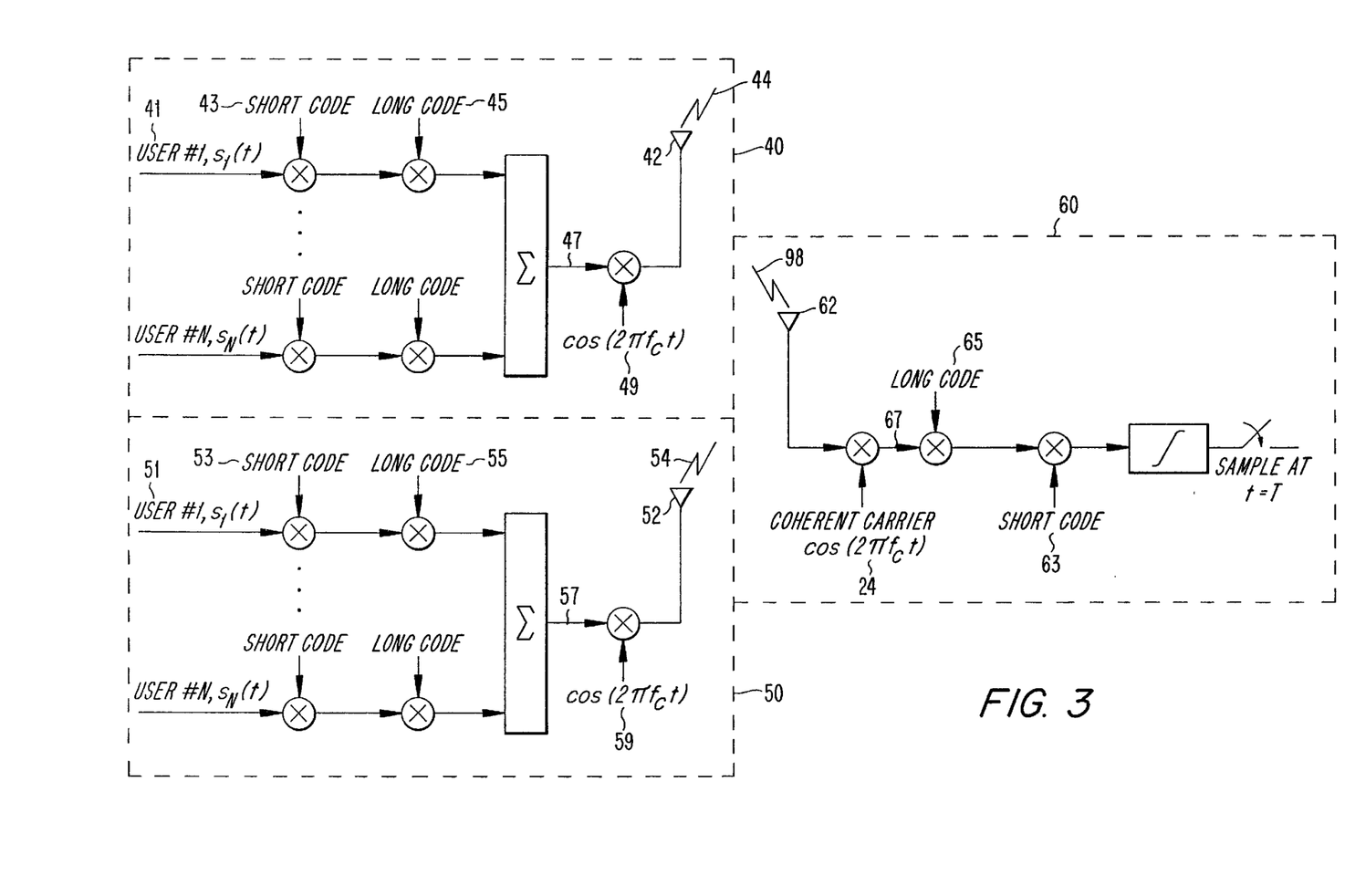
FIG. 3 illustrates two sources that transmit different signals over the same frequency spectrum.

FIG. 3 illustrates two sources that transmit different signals over the same frequency spectrum. Sources 40 and 50 receive input user data from multiple users. The input user data are multiplied by an orthogonal short code and spread by an additional long code. The sum of the coded and spread user data is then transmitted using a radio frequency carrier and a transmitting antenna. For example, in FIG. 3, user input data 41 is multiplied by an orthogonal short code 43 and spread using a long code 45. The sum of the coded and spread user data 47 is used to modulate a radio frequency carrier 49 which is transmitted by transmitting antenna 42.

Similarly, user input data 51 is multiplied by an orthogonal short code 53 and spread using a long code 55. The sum of the coded and spread user data 57 is used to modulate a radio frequency carrier 59 which is transmitted by transmitting antenna 52. Transmitting antenna 42 transmits signal 44 and transmitting antenna 52 transmits signal 54. If sources 40 and 50 are at the same base station, it is relatively easy to synchronize sources 40 and 50. Sources 40 and 50 can use the same long code. If on the other hand, sources 40 and 50 are in different cells, they may use a different long code and/or time reference. It will be evident to those skilled in the art that the signals transmitted by sources 40 and 50 can be multiplied or correlated with codes other than the ones shown.

Receiver 60 has a receiving antenna 62. Signals 44 and 54 experience reflection, diffraction, and scattering. Reflections of signals 44 and 54 travel along different paths of varying lengths. The interactions between these reflections cause multipath fading at a specific location, and the strengths of these signals decrease as the distance between the source and the receiver increases. Receiver 60 can use a RAKE receiver to collect the signal energy from different signal paths. When receiver 60 receives signal 98, receiver 60 demodulates the signal using carrier signal 24 to provide composite signal 67. Composite signal 67 is despread using synchronized long code 65 and decoded using synchronized orthogonal code 63. In order to reconstruct a particular input user data signal, receiver 60 has to know the appropriate long code and short code. Receiver 60 can use an integrator 67 and a sampler 69 to recreate the transmitted signal.

If, for example, receiver 60 is receiving input user data 41 via transmitting antenna 42 then long code 65 is a synchronized complex conjugated version of long code 45 and orthogonal code 63 is a synchronized complex conjugated version of orthogonal code 43. Receiver 60 can use a correlator to synchronize the complex conjugated version of the long code and the complex conjugated version of the orthogonal code with source 40. As discussed above, when the quality of the received signal decreases to the point that another source can provide a better signal or the system determines that it can decrease the amount of interference experienced by other mobile stations in the cellular system, the base station should perform a handoff. If, for example, source 50 is a better source than source 40, source 40 should handoff receiver 60 to source 50. It is helpful if receiver 60 can measure the quality of signals received from other sources, such as source 50, and report these measurements to source 40.

Figure 4:
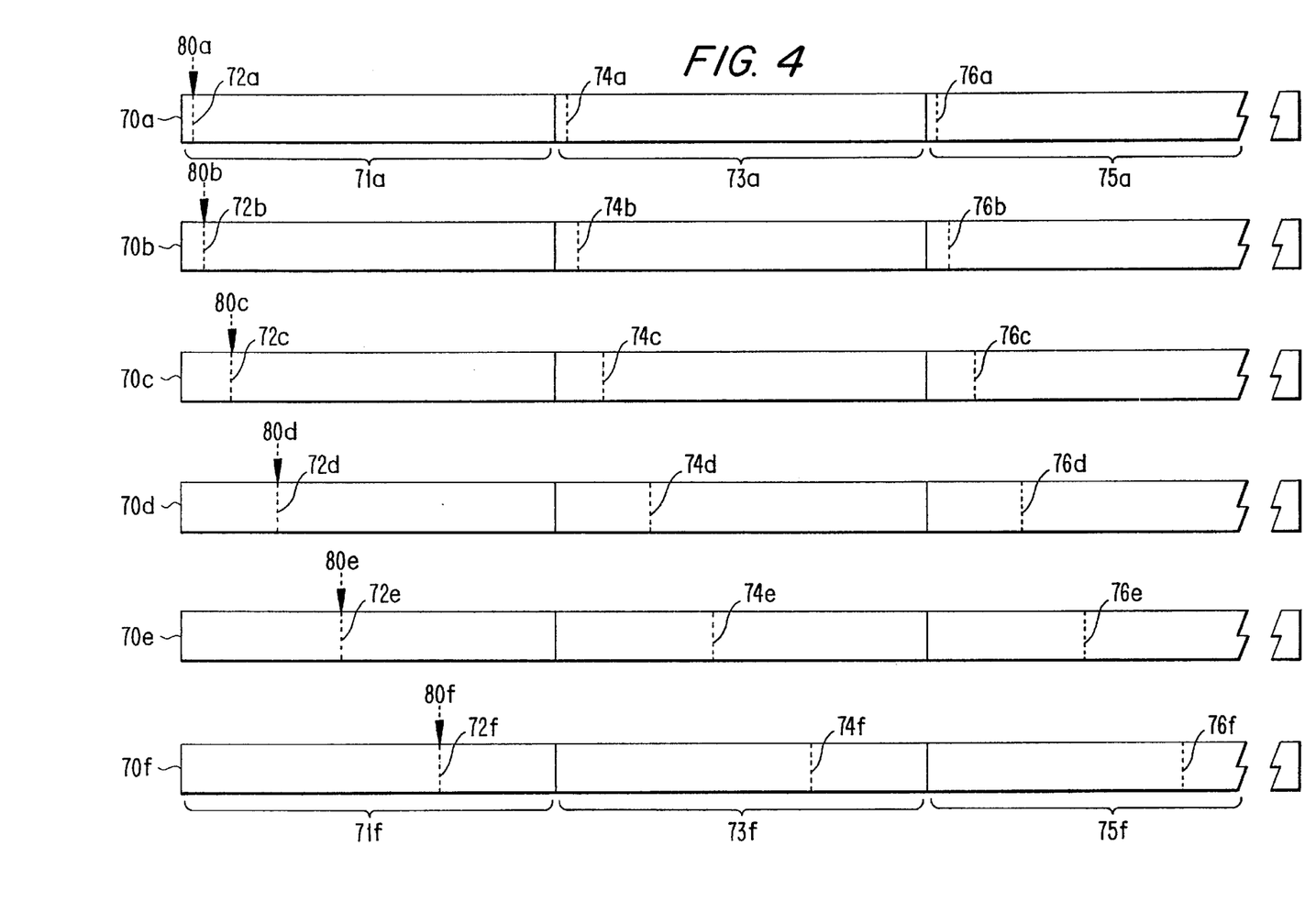
FIG. 4 illustrates shifting the long codes and synchronization codes.

FIG. 4 illustrates shifting the long codes and synchronization codes. A first source (not shown) transmits signal 70a. Signal 70a comprises slots 71a, 73a, and 75a. Slots 71a, 73a, and 75a and other slots (not shown) can make up a frame. Signal 70a has a first synchronization code that begins at point 72a, a second synchronization code that begins at point 74a, and a third synchronization code that begins at point 76a. Each synchronization code has the same slot location. While in the example shown, each slot uses the same synchronization code, it will be evident to those skilled in the art that some of the synchronization codes can be altered or eliminated. It will also be evident to those skilled in the art that a frame can have one slot, eight slots, sixteen slots, or any other number of slots.

Signal 70a is multiplied by a long code that begins at point 80a. The long code begins at the same point as the first synchronization code. Therefore, the first n chips of the first synchronization code are multiplied by the first n chips of the long code, and the first n chips of the second synchronization code are multiplied by chips (L+1) through (L+1)+n of the long code, where L is the length of slot 71a. The long code can span multiple slots of signal 70a. For example, if the long code is the same length as a frame, and each frame has sixteen slots, the long code will span sixteen slots of signal 70a.

A second source (not shown) transmits signal 70b. Signal 70b comprises slots 71b, 73b, and 75b. Signal 70b has a first synchronization code that begins at point 72b, a second synchronization code that begins at point 74b, and a third synchronization code that begins at point 76b. Signal 70b is multiplied by a long code that begins at point 80b. The difference between points 72b and 72a is the same as the difference between point 80b and 80a.

A third source (not shown) transmits signal 70c. Signal 70c comprises slots 71c, 73c, and 75c. Signal 70c has a first synchronization code that begins at point 72c, a second synchronization code that begins at point 74c, and a third synchronization code that begins at point 76c. Signal 70c is multiplied by a long code that begins at point 80c.

Signals 70d–f are transmitted by sources four, five, and six (not shown). All six sources can shift the long code by a different amount so that for any two sources there is a unique difference between the shifts in the long code. For example, the first source shifts the long code an amount equal to one; the second source shifts the long code an amount equal to two; the third source shifts the long code an amount equal to four; the fourth source shifts the long code an amount equal to eight; the fifth source shifts the long code an amount equal to thirteen; and, the sixth source shifts the long code an amount equal to twenty-one.

Each synchronization code can be shifted an amount equal to the shift in the long code. The synchronization code can be any type of pilot or pilot code that is relatively easy for the mobile station to detect. The synchronization codes can be found by using a matched filter or a correlation scheme, and by identifying the correlation peaks. The unique differences can be found by finding the differences in time between the correlation peaks.

It will be appreciated by those skilled in the art that the optimum pattern for shifting the long codes and synchronization patterns depends on, e.g., the cellular system, the type of channel, the number of signals, the reliability of each clock, the number of symbols per frame, and/or the number of chips per channel. It is possible to design different patterns for shifting the long codes and synchronization codes by using, for example, the following table (Table 1).

TABLE 1

| First Shift | 1 |
|---|---|
| Second Shift | 1 + 1 k |
| Third Shift | 1 + 3 k |
| Fourth Shift | 1 + 7 k |
| Fifth Shift | 1 + 12 k |
| Sixth Shift | 1 + 20 k |

It will be evident to those skilled in the art that there are other patterns than the one described above. The constant k can equal any number of chips or symbols. In other words, the long codes and synchronization codes can be shifted less than or part of a symbol. If the pattern is defined by the equations in Table 1, then the differences between the shifts are given by the equations in the following table (Table 2).

TABLE 2

|  | Second shift | Third shift | Fourth shift | Fifth shift | Sixth shift |
|---|---|---|---|---|---|
| First Shift | 1 k | 3 k | 7 k | 12 k | 20 k |
| Second Shift |  | 2 k | 6 k | 11 k | 19 k |
| Third Shift |  |  | 4 k | 9 k | 17 k |
| Fourth Shift |  |  |  | 5 k | 13 k |
| Fifth Shift |  |  |  |  | 8 k |

For the values k=1, 3, and 4, the shifts are given by the following table (Table 3).

TABLE 3

|  | k = 1 | k = 3 | k = 4 |
|---|---|---|---|
| First Shift | 1 | 1 | 1 |
| Second Shift | 2 | 4 | 5 |
| Third Shift | 4 | 10 | 13 |
| Fourth Shift | 8 | 22 | 29 |
| Fifth Shift | 13 | 37 | 49 |
| Sixth Shift | 21 | 61 | 81 |

For the values k=1, 3, and 4, the differences between the shifts are given by the following table (Table 4).

TABLE 4

|  | Second Shift | Third Shift | Fourth Shift | Fifth Shift | Sixth Shift |
|---|---|---|---|---|---|
| First Shift | 1, 3, 4 | 3, 9, 12 | 7, 21, 28 | 12, 36, 48 | 20, 60, 80 |
| Second Shift |  | 2, 6, 8 | 6, 18, 24 | 11, 33, 44 | 19, 57, 76 |
| Third Shift |  |  | 4, 12, 16 | 9, 27, 36 | 17, 51, 68 |
| Fourth Shift |  |  |  | 5, 15, 20 | 13, 39, 52 |
| Fifth Shift |  |  |  |  | 8, 24, 32 |

If the receiver receives two signals with the same long code, but different time shifts, the receiver can directly identify the source of both signals. The receiver can store or obtain a list of the differences associated with each pair of sources. The receiver does not have to synchronize with the source of the signals or calculate the exact amount of shift. The receiver can use a correlator or similar means to find the starting points (or relative locations) of the synchronization codes, the long code, or portions thereof. If the receiver uses correlation peaks to identify the starting points (or relative locations) of a code, the difference generator can generate the differences in time between the correlation peaks.

It will be appreciated by those skilled in the art that calculation of the differences between each of the shifts is adversely affected by jitter, i.e., variances in the clocks used to synchronize a particular group of signals. Increasing the value of k increases the differences between each of the shifts and decreases the possible adverse effects of jitter.

It will also be appreciated by those skilled in the art that the minimum difference, for example, the difference between the first shift and the second shift, should be greater than an estimated maximum multipath delay. Otherwise an echo could be mistaken as another synchronization code.

It will also be appreciated by those skilled in the art that the value of k is limited by the size of the frame or long code. If, for example, a frame has sixteen slots of ten symbols, and each symbol is coded with 256 chips, then the frame has 40,960 chips, and the value of k should be less than 4 symbols or less than 1024 chips.

Assume, for example, that in FIG. 4, slots 71a, 73a, 75a, and thirteen other slots (not shown) make up a frame. If the long code that begins at point 80a is the same length as the frame and the long code is repeated every frame, the first synchronization code in the next frame is multiplied by the same portion of the long code as the synchronization code that begins at point 72a. Because there are 160 symbols in the frame, the first synchronization code in the next frame begins at the beginning of the one hundred sixty-first symbol. If k=4 symbols, then the long code and the synchronization code at the sixth source is shifted eighty symbols so that the first synchronization code 72f begins at the beginning of the eighty-first symbol. The difference between point 72a and 72f is equal to eighty symbols. However, the difference between point 72f and point 74a is also eighty symbols. In other words, if k=4 symbols, the receiver may confuse the first source and the sixth source.

Figure 5:
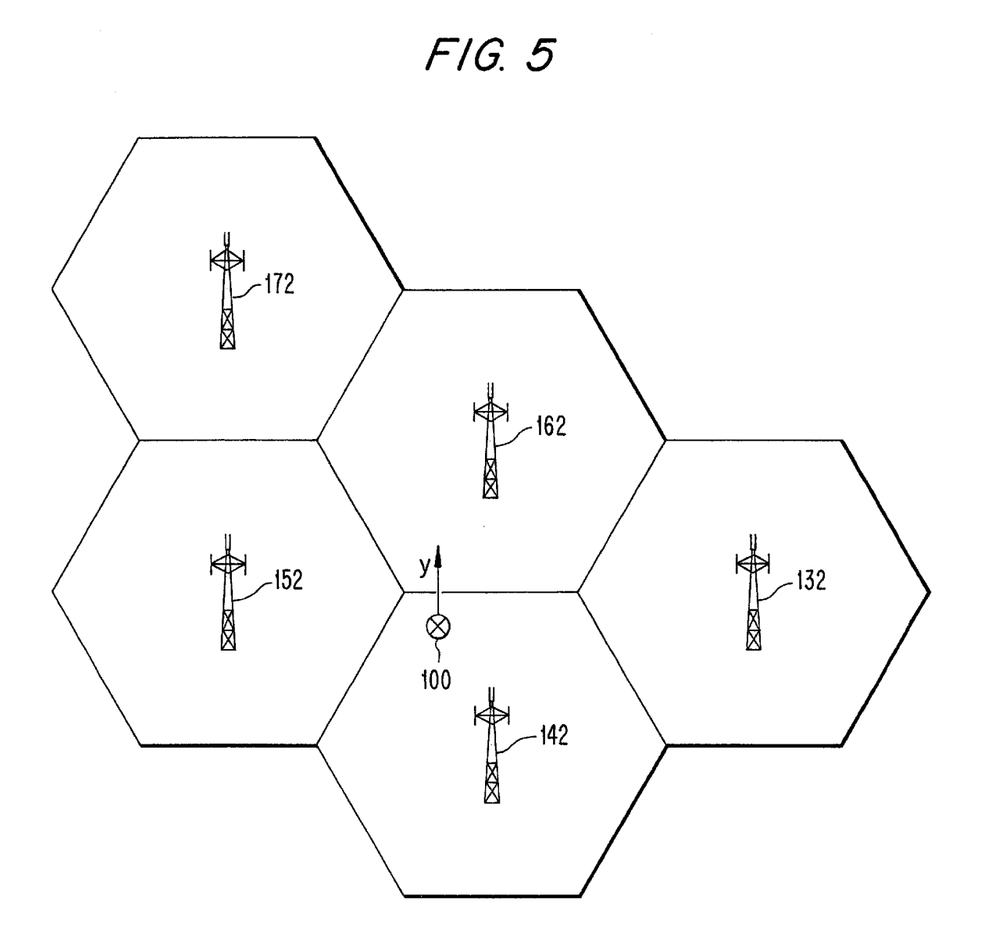
FIG. 5 illustrates an exemplary embodiment of the present invention.

FIG. 5 illustrates an exemplary embodiment of the present invention. A first group of base stations comprises base stations 132 and 142. Base stations 132 and 142 can use the same time reference and the same long code. If mobile station 100 is synchronized with one of the base stations in the first group, mobile station 100 is synchronized with the other base stations in the group. If each base station shifts the long code a different pre-determined amount, the mobile station can identify the source of signals from other base stations in the group by measuring the amount that the long code has been shifted.

Assume that base station 142 provides the best signal. As mobile station 100 moves in direction y, the quality of the signal may decrease. When the quality of the received signal decreases to the point that another source can provide a better signal or the system determines that it can decrease the amount of interference experienced by other mobile stations in the system, the system should perform a handoff. The mobile station can assist the system in performing the handoff by identifying the cell number of the better source.

A second group of base stations comprises base stations 152, 162, and 172. The second group of base stations can use a second long code. If each base station in the second group shifts the long code a different pre-determined amount, mobile station 100 can identify the cell number of the better source. If, however, the first group is not synchronized with the second group, the mobile station can not directly identify how much the long code has been shifted. Therefore, each base station in the second group shifts the long code and the synchronization codes by a different amount so that for any two base stations there is a unique difference between the shifts.

For example, base station 152 shifts the long code and synchronization codes an amount equal to one chip so that the long code and synchronization codes have a starting point that is equal to the first chip in the first symbol. Base station 162 shifts the long code and synchronization codes an amount equal to one plus the number of chips in three symbols so that the long code and synchronization codes have a starting point that is equal to the first chip in the fourth symbol. Base station 172 shifts the long code and synchronization codes an amount equal to one plus the number of chips in nine symbols so that the long code and synchronization symbols have a starting point that is equal to the first chip in the tenth symbol.

As a result, if mobile station 100 receives two signals from the second group, mobile station 100 can directly identify the source of both signals. Mobile station 100 can store or obtain a list of the differences associated with each pair of base stations. Mobile station 100 does not have to synchronize with any of the base stations or calculate the exact amount of shift. Mobile station 100 can use a correlator or similar means to find the starting points (or the relative locations) of the synchronization codes, the long code, or portions thereof. If a matched filter or other correlation scheme is used, the difference generator can generate the difference between the correlation peaks.

If, for example, the difference generator calculates a difference equal to the number of chips in three symbols, mobile station 100 knows that it has received signals from base station 152 and 162. If the difference generator calculates a difference equal to the number of chips in six symbols, mobile station 100 knows that it has received signals from base station 162 and 172. And if the difference generator calculates a difference equal to the number of chips in nine symbols, mobile station 100 knows that it has received signals from base station 152 and 172.

Figure 7:
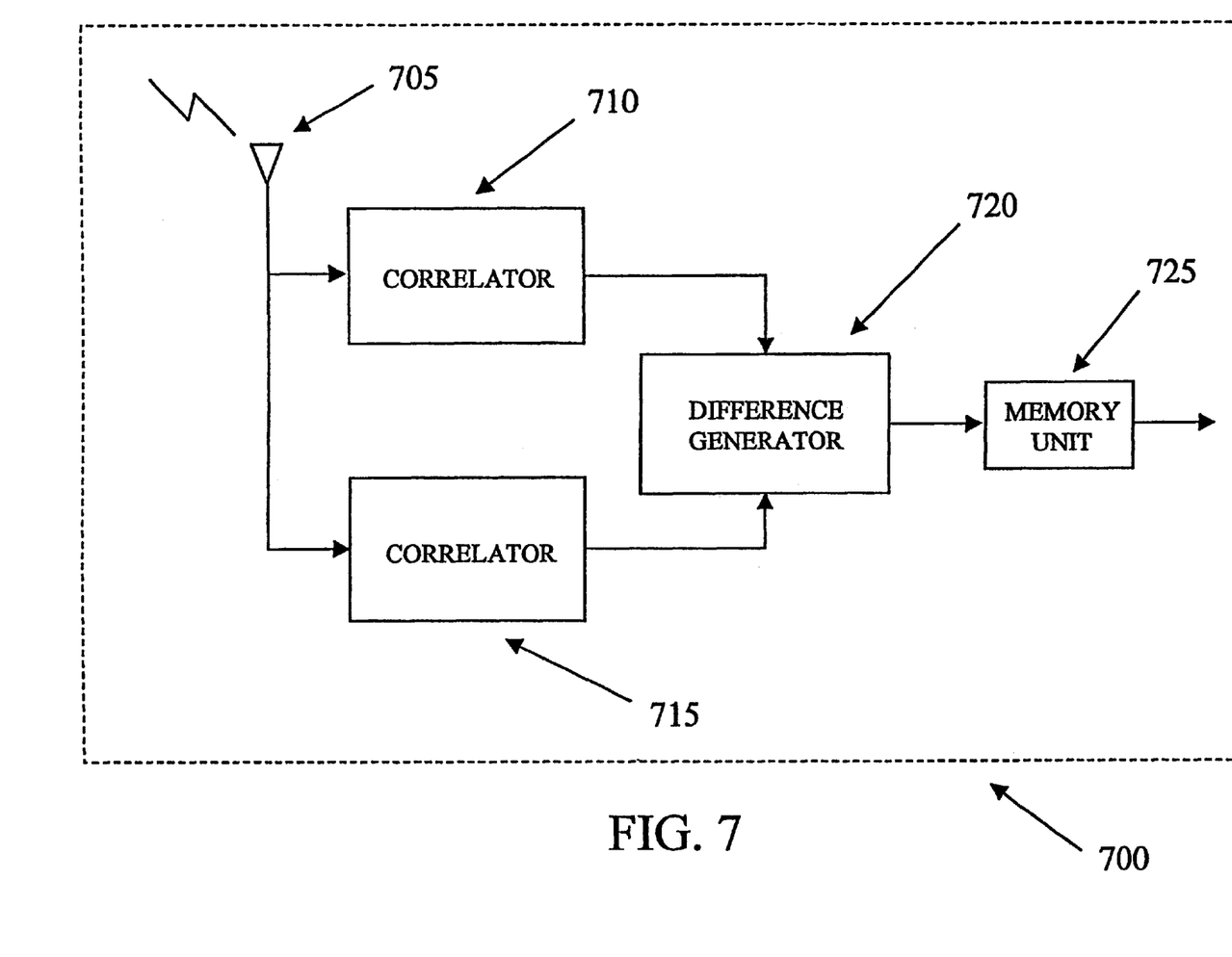
FIG. 7 illustrates a system that can directly identify a source of a digital signal from an unsynchronized source in accordance with an exemplary embodiment of the present invention.

A receiver 700 that can directly identify a source of a digital signal from an unsynchronized source in accordance with exemplary embodiments of the present invention is shown in FIG. 7. Receiver 700 can include an antenna 705 that can receive a first signal and a second signal. Receiver 700 can include a first correlator, such as, for example, correlator 710, that can correlate a code with the first signal to identify a first location in the first signal. Receiver 700 can include a second correlator, such as, for example, correlator 715, that can correlate the code with the second signal to identify a second location in the second signal. Receiver 700 can include a difference generator, such as, for example, difference generator 720, that can calculate a time difference between the first location and the second location, in which the time difference identifies a pair of sources of the digital signal. Receiver 700 can also include a memory unit 725 that can store a plurality of differences associated with pairs of sources.

Figure 6:
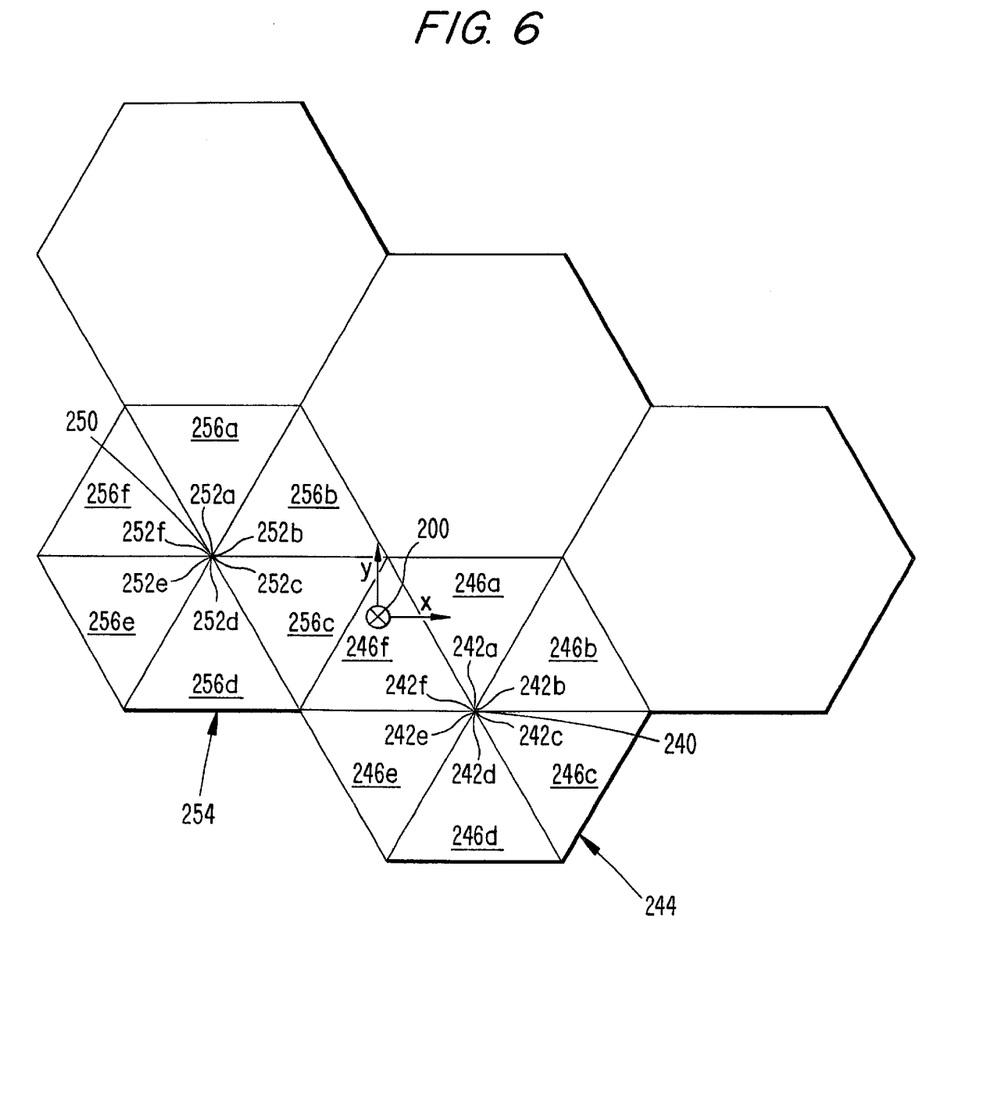
FIG. 6 illustrates another exemplary embodiment of the present invention.

FIG. 6 illustrates another exemplary embodiment of the present invention. Base station 240 uses directional antennas 242a–f to divide cell 244 into six sectors 246a–f. Similarly, base station 250 uses six directional antennas 252a–f to divide cell 254 into six sectors 256a–f. Directional antennas 242a–f can use the same clock and the same long code. If mobile station 200 is synchronized with one of the directional antennas at base station 240, mobile station 200 is synchronized with all the directional antennas at base station 240. If each directional antenna shifts the long code a different pre-determined amount, the mobile station can identify the source of signals from the other directional antennas from base station 240 by measuring the amount that the long code has been shifted.

Assume that directional antenna 242f provides the best signal. If, for example, mobile station 200 moves in direction x, directional antenna 242a may become a better source. If mobile station 200 identifies that directional antenna 242a is a better source than 242f, then directional antenna 242f should handoff mobile station 200 to directional antenna 242a. If, for example, mobile station 200 moves in direction y, directional antenna 252b or 252c may become a better source. If mobile station 200 identifies that directional antenna 252b or 252c is a better source than directional antenna 242f, then directional antenna 242f should handoff mobile station 200 to directional antenna 252b or 252c.

Directional antennas 252a–f can use a second long code. If each directional antenna at base station 250 shifts the long code a different pre-determined amount, mobile station 200 can identify the cell number and the sector number of the better source. If, however, mobile station 200 is not synchronized with base station 250, the mobile station can not directly identify how much the long code has been shifted. Therefore, each directional antenna at base station 250 should shift the long code and the synchronization codes by a different amount so that for any two directional antenna there is a unique difference between the shifts.

As a result, if mobile station 200 receives two or more signals from base station 250, mobile station 200 can directly identify the source of both signals. Mobile station 200 can store or obtain a list of the differences associated with each pair of directional antennas. Mobile station 200 does not have to synchronize with any of the directional antennas or calculate the exact amount of shift. Mobile station 200 can use a correlator or similar means to find the starting points of the synchronization codes, the long code, or portions thereof. If a matched filter or other correlation scheme is used, the difference generator can generate the difference between the correlation peaks.

It will be evident to those skilled in the art that there are other shift patterns than those described above and that these patterns can be applied to other codes besides long codes and/or synchronization codes. While the foregoing description makes reference to particular illustrative embodiments, these examples should not be construed as limitations. Not only can the inventive system be modified for other base station or base station/satellite arrangements, but the inventive system can also be modified for other synchronization methods and multiple access schemes. Thus, the present invention is not limited to the disclosed embodiments, but is to be accorded the widest scope consistent with the claims below.

What is claimed is:

1. A receiver that can directly identify a source of a digital signal from an unsynchronized source, the receiver comprising:
    an antenna, the antenna receiving a first signal and a second signal;
    a first correlator, the first correlator correlating a code with the first signal to identify a first location in time of the code in the first signal;
    a second correlator, the second correlator correlating the code with the second signal to identify a second location in time of the code in the second signal; and,
    a difference generator, the difference generator calculating a time difference between the first location in time of the code in the first signal and the second location in time of the code in the second signal, wherein the time difference identifies a pair of sources of the digital signal.

2. A receiver as described in claim 1, further comprising a memory unit, the memory unit storing a plurality of time differences associated with pairs of sources.

3. A receiver as described in claim 2, wherein there is a unique time difference for each pair of sources.

4. A receiver as described in claim 3, wherein the code is a portion of a long code.

5. A receiver as described in claim 3, wherein the first location is the beginning of a long code.

6. A receiver as described in claim 3, wherein the first location is the beginning of a portion of a long code.

7. A receiver as described in claim 3, wherein the first location is the beginning of a synchronization code.

8. A receiver as described in claim 7, wherein the synchronization code is repeated in time.

9. A receiver that can directly identify a source of a digital signal from an unsynchronized source, the receiver comprising:
    means for receiving a first signal;
    means for receiving a second signal;
    means for determining a first location in time of a code in the first signal;
    means for determining a second location in time of the code in the second signal; and,
    means for calculating a time difference between the first location in time of the code in the first signal and the second location in time of the code in the second signal, wherein the time difference identifies a pair of sources of the digital signal.

10. A receiver as described in claim 9, further comprising means for storing a plurality of time differences associated with pairs of sources.

11. A receiver as described in claim 10, wherein there is a unique time difference for each pair of sources.

12. A receiver as described in claim 11, wherein the code is a long code.

13. A receiver as described in claim 11, wherein the code is a portion of a long code.

14. A receiver as described in claim 11, wherein the code is a synchronization code.

15. A receiver as described in claim 14, wherein the synchronization code is repeated in time.

16. A radio communication system having source identifiable transmissions that can be identified by an unsynchronized receiver, the system comprising:
    a first source, the first source transmitting a first signal using a code with a first shift; and,
    a second source, the second source transmitting a second signal using the code with a second shift;
    wherein the difference between the first and the second shift is an unique difference, and wherein the unique difference identifies a pair of sources of the transmissions.

17. A radio communication system having source identifiable transmissions that can be identified by an unsynchronized receiver, the system comprising:
    a first source, the first source transmitting a first signal using a code with a first shift;
    a second source, the second source transmitting a second signal using the code with a second shift; and,
    a third source, the third source transmitting a third signal using a code with a third shift, wherein the second shift minus the first shift and the third shift minus the first shift are unique differences, wherein each unique difference identifies a pair of sources of the transmissions.

18. A system as described in claim 17, wherein the code is a long code.

19. A system as described in claim 17, wherein the code is a synchronization code.

20. A system as described in claim 19, wherein the synchronization code is repeated in time.

21. A method for identifying a source of a signal, the method comprising the steps of:

receiving a first signal;

receiving a second signal;

determining a first location in time of a code in the first signal;

determining a second location in time of the code in the second signal; and calculating a time difference between the first location in time of the code in the first signal and the second location in time of the code in the second signal, wherein the time difference identifies a pair of sources of the signals.

22. A method as described in claim 21, the method further comprising the step of:

searching a list of time differences associated with pairs of sources.

23. A method as described in claim 22, wherein the code is a long code.

24. A method as described in claim 22, wherein the code is a portion of a long code.

25. A method as described in claim 22, wherein the code is a synchronization code.

26. A method as described in claim 25, wherein the synchronization code is repeated in time.

27. A method for transmitting a source identifiable signal, the method comprising the steps of:

transmitting a first signal using a code with a first shift; and, transmitting a second signal using the code with a second shift;

wherein the difference between the first and the second shift is an unique difference, and wherein the unique difference identifies a pair of sources of the signals.

28. A method of transmitting a source identifiable signal, the method comprising the steps of:

transmitting a first signal using a code with a first shift;

transmitting a second signal using the code with a second shift; and, transmitting a third signal using the code with a third shift, wherein the second shift minus the first shift and the third shift minus the first shift are unique differences, wherein each unique difference identifies a pair of sources of the signal.

29. A method as described in claim 28, wherein the code is a long code.

30. A method as described in claim 28, wherein the code is a synchronization code.

31. A method as described in claim 30, wherein the code is repeated in time.

32. A receiver as described in claim 1, wherein the code is the same code used for the first signal and the second signal, and wherein the code has a first time shift for the first signal and a second time shift for the second signal.

33. A receiver as described in claim 9, wherein the code is the same code used for the first signal and the second signal, and wherein the code has a first time shift for the first signal and a second time shift for the second signal.

34. A method as described in claim 21, wherein the code is the same code used for the first signal and the second signal, and wherein the code has a first time shift for the first signal and a second time shift for the second signal.

* * * * *